United States Patent [19]
Corliss

[11] Patent Number: 6,149,437
[45] Date of Patent: Nov. 21, 2000

[54] METHOD FOR MAKING TOYS FROM PLIANT RODS

[76] Inventor: Kathrine Kawamura Corliss, 718 St. James Pl., Newport Beach, Calif. 92663

[21] Appl. No.: 09/430,641

[22] Filed: Oct. 29, 1999

Related U.S. Application Data

[62] Division of application No. 09/094,646, Jun. 15, 1998.

[51] Int. Cl.$^7$ .................................................. G09B 19/20
[52] U.S. Cl. ................................ 434/95; 139/29; 139/34; D3/18; D15/66; 28/151; 28/152; 434/81
[58] Field of Search ................................ 434/81, 95, 211; 139/29, 34; D3/18, 26; D15/66; 28/151, 152

[56] References Cited

U.S. PATENT DOCUMENTS

| | | | |
|---|---|---|---|
| D. 259,302 | 5/1981 | Davis | D3/26 |
| 1,632,302 | 6/1927 | Lichtenstein | 434/95 |
| 2,136,552 | 11/1938 | Page | 114/79 R |
| 3,451,879 | 6/1969 | Fuller | 434/83 |
| 3,752,730 | 8/1973 | Koff | 434/83 |
| 3,879,823 | 4/1975 | Lamb | 139/34 |

*Primary Examiner*—Sam Rimell
*Assistant Examiner*—Bena B. Miller
*Attorney, Agent, or Firm*—Mathews, Collins, Shepherd & Gould, P.A.

[57] ABSTRACT

A method for making toys and toy figures from pliant rods such as pipe cleaners comprises providing an elongated member having a plurality of openings passing therethrough, the openings being arranged substantially linearly across the length of the member and configured to receive pliant rods. When one pliant rod (e.g., pipe cleaner) is thread through each one of the plurality of openings, a warp weave is defined. Pliant rods are weaved through the warp weave to create a woof weave and ultimately, a weaved piece. Once the weaved piece is formed, it can be removed from the device and then bent, twisted, and otherwise flexed to create a multiplicity of different toys drawing on the user's creativity.

5 Claims, 7 Drawing Sheets

METHOD FOR MAKING TOYS FROM PLIANT RODS

RELATED APPLICATIONS

This application is a divisional of U.S. patent application Ser. No. 09/094,646, filed on Jun. 15, 1998, which is incorporated herein by reference and claims the benefit of the filing date thereof.

FIELD OF THE INVENTION

The present invention relates to a method for making toy figures and playthings from pipe cleaners (or other like pliant rods).

BACKGROUND OF THE INVENTION

It is important for children to have playthings which are both safe and fun for them to use. Since a child may spend much time playing during his or her developmental years, another significant consideration in making toys is that they aid in developing the child's intellect and creativity. Creative leisure activities are indeed beneficial for people of all ages. It is also helpful for toys to be sturdy, that is, unlikely to break or crack when dropped or handled roughly, and which are simple and inexpensive to make, thus minimizing their cost.

Weaving devices intended for use as playthings have been known. For example, weaving toys are described in the following patents: U.S. Pat. Nos. 2,136,552, titled "Hand Loom," issued to Page on Nov. 15, 1938; 2,527,333, titled "Toy Handweaving Device," issued to Raizen on Oct. 24, 1950; 2,601,715, titled "Weaving Device," issued to Simonds on Jul. 1, 1952; and 3,294,124, titled "Adjustable Weaving Loom," issued to Berger on Dec. 27, 1966.

Each of the frames described in the foregoing patents are designed for weaving fabric or yarn into cloth or rectangular pads. (See, e.g., Raizen '333 pat., col. 4, lines 42–50; Berger '124 pat., col. 1, line 45; Page '552 pat., page 2, col. 3, line 3). Thus, the user is limited with these toys to making pads of material, such as weaved pot holders or other pieces of cloth. Accordingly, the extent to which the toy may aid in developing one's creativity is constrained. Also, the device (s) that may be used in those cases are limited in that a frame having four sides defining a square or rectangular frame is required, so that the yarn or string can be held taut between facing parallel sides of the frame. None of the foregoing patents describe a device or method for making toys or toy figures.

Other weaving devices are described in U.S. Pat. No. 2,601,222, titled "Toy Bead Loom," issued to Wehrli on Jun. 17, 1952, and U.S. Pat. No. 3,879,823, titled "Weaving Apparatus and Method of Using and Resulting Toy," issued to Lamb on Apr. 29, 1975. With the device described in the Wehrli patent, beaded items such as necklaces and belts may be made. Again, this patent does not disclose a device or method for making toy figures. Also, in Wehrli, a needle is used to weave beads onto a weaving apparatus which could be difficult for small children to handle, and the weaving apparatus is more complicated, e.g., it has more parts, than the frames of the previously-described patents. The frame described in the Lamb patent may be used to make toys. In Lamb, the material being weaved is a continuous piece of yarn or string which is wrapped around axles disposed in a parallel orientation relative to each other. In Lamb, after the yarn is wound around the dowel members, it is severed, i.e., with use of a knife or razor blade (see Lamb '823 pat., col. 6, lines 11–12). Naturally the need to use a knife or razor blade in conjunction with a child's plaything presents disadvantages.

Thus, it would be advantageous to have a weaving device and method that is flexible in terms of the items that may be created with the toy to aid in developing one's creativity.

SUMMARY OF THE INVENTION

Applicant has discovered that pliant rods, such as tufted rods commonly known as pipe cleaners, may be weaved together to create pieces from which various toys and figures may be formed, drawing upon the user's creativity. A weaving device for forming the weaved pieces may take many forms and be made from various materials but in one embodiment comprises an elongated member having two opposing side surfaces and a plurality of holes traversing the member from one side surface to the other side surface. When one pliant rod is thread through each of the plurality of slots or holes, a warp weave may be defined for creating the weaved piece. The pliant rods are sufficiently stiff to remain suspended in the member, and pliant rods then may be thread through the warp weave to form a weaved piece.

A method for making toys from pliant rods (e.g., pipe cleaners) comprises using the device to form the weaved piece, removing the weaved piece from the device, and bending and twisting the piece to form toys. With this method, free-standing three-dimensional figures may be formed. This method draws on the user's creativity and thus helps develop the user's creativity and intellect. Further advantages may appear more fully upon considering the description given below.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

Figure 1A:
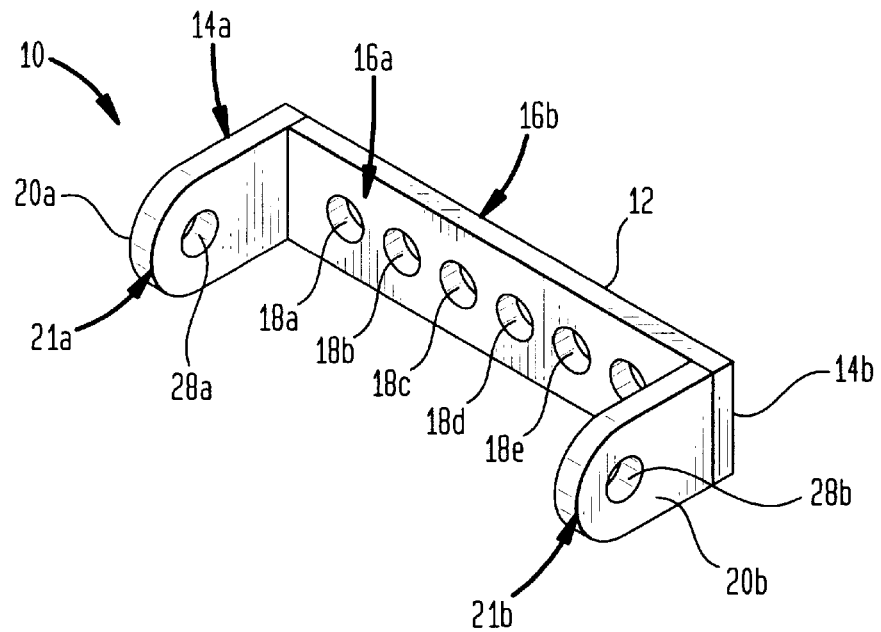
FIG. 1A shows a frontal, perspective view of one embodiment of the inventive weaving device for use in the inventive method.

The weaving toy used in this invention may take many forms. One embodiment is shown in FIG. 1A which, as with the other embodiments, may be used to weave pliant rods (advantageously pipe cleaners), into a weaved piece. A child or adult user may then configure the weaved piece into any number of toy figures, applying the user's creativity. For the inventive method, a first step is to provide a frame for holding a plurality of pliant rods in place in parallel spaced-apart relation, so that other pliant rods can be weaved between them. Referring to FIG. 1A, the frame may comprises a first elongated member 12 having two ends 14a, 14b and two opposing side surfaces 16a, 16b. The member 12 has a plurality of holes 18a, 18b, 18c, 18d, 18e, etc., traversing its width from one side surface 16a to the other side surface 16b, and the plurality of holes are disposed substantially linearly across the length of the elongated member (e.g., in FIG. 1A between the two ends 14a, 14b). The size of the holes or other openings in terms of their diameter will depend upon the size of the pliant rods being weaved. For example, when tufted pliant rods commonly known as "pipe cleaners" are used (as preferred), the diameter of each hole advantageously is about one-fifth to two-fifths of a centimeter. This way, the diameter is sufficiently small to frictionally engage the tufts of the pipe cleaner. However, other pliant rods also may be used of various sizes. The holes or openings in the frame may be referred to herein as "pliant rod holes" the term reflecting any opening that has a diameter to allow for the passing of at least one pliant rod therethrough.

Looking still at FIG. 1A, two lateral bars 20a, 20b may project outward from one side surface (e.g., 16a) of the first elongated member, although the lateral bars are not required. The bars 20a, 20b, are spaced apart from each other so that at least one pliant rod (e.g., 40, FIGS. 1B, 2), may be suspended between the two lateral bars along the length of the elongated member, e.g., substantially parallel to the member. The particular pliant rod 40 suspended between the lateral bars 20a, 20b adjacent or closest to the elongated member will be referred to herein as the woof weave base 40 or the woof base, which may be the starting point for the threading of pliant rods horizontally relative to the elongated member.

One lateral bar 20a may project from one end 14a of the elongated member, and 20 the other lateral bar 20b may project from the other end of the member 14b, although the lateral bars also may be disposed inward of the ends or even movable relative to the ends, the important consideration being that they be spaced apart so that at least one pliant rod defining the woof base (e.g., 40, FIGS. 1B, 2), may be held along the length of the member. Each of the lateral bars may have a pliant rod hole 28a, 28b (or other opening), passing therethrough for holding an end of the woof base 40, which is preferred. However, other means for holding the woof base to the lateral bars (not shown) may be used, e.g., clips or frame pieces about which the ends of the woof base may be twisted. The lateral bars may terminate at tips 21a, 21b (FIG. 1A), shortly after the woof base holes 28a, 28b, in the lateral bars, or they may extend lengthwise further away from the elongated member. The tips 21a, 21b, if used, need not be curved as shown in FIG. 1A, and may take many forms with the curved tips being shown for illustrative purposes. For example, it should be understood that the tips 21a, 21b may be joined and the corners 14a, 14b, rounded to define a substantially circular or oval frame.

Figure 1B:
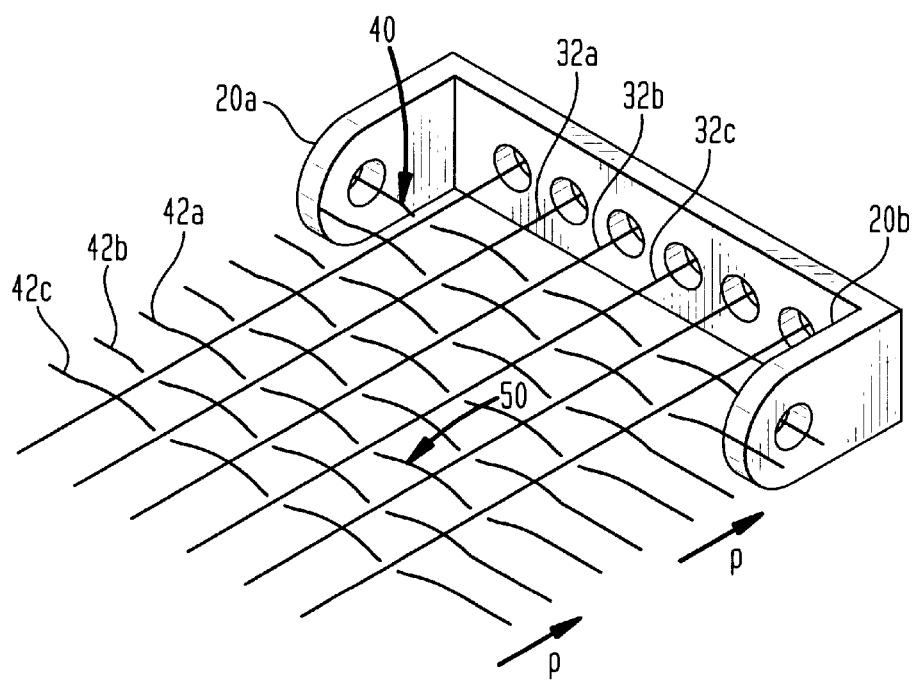
FIG. 1B shows the view and embodiment of FIG. 1A with pliant rods forming a weaved piece with use of the device.

FIG. 1B shows the view and embodiment of FIG. 1A with pliant rods forming a weaved piece 50 with use of the weaving device. The weaved piece 50 is formed of warp threads, e.g., 32a, 32b, 32c, etc., running lengthwise, i.e., vertically relative to the elongated member, and woof threads, e.g., 42a, 42b, 42c, etc., running breadthwise, i.e., horizontally relative to the elongated member and at substantially right angles to the warp threads. The warp threads together define the warp weave of the piece 50, and the woof threads define a woof weave.

Referring still to FIG. 1B, an exemplary use of the frame in performing the inventive method is shown. In use, one pliant rod may be thread through each of the plurality of holes 18a, 18b, etc. (or slots), of the elongated member to form the warp weave. The pliant rod 40 defining the woof weave base or starting point is held between the lateral bars 20a, 20b. The order in which those steps are performed is not critical and is a matter of user preference. The warp weave rods 32a, 32b, may be inserted into the elongated member before the woof base 40 is attached to the lateral bars (in which case the base 40 is weaved through the warp weave rods), or else the woof base may be attached to the lateral bars first, before the rods 32a, 32b, 32c defining the warp weave are inserted into the member 12. In any case, once the warp weave and the woof base are formed, the additional rods 42a, 42b, 42c, defining the woof weave may be successively inserted into the warp weave and pushed up against the elongated member, following arrows "P" of FIG. 1B, to tighten the weave and form the weaved piece 50. Naturally, the order in which the warp and woof weaves are formed is a matter of user preference and may be altered depending on what the user finds most comfortable.

Figure 2:
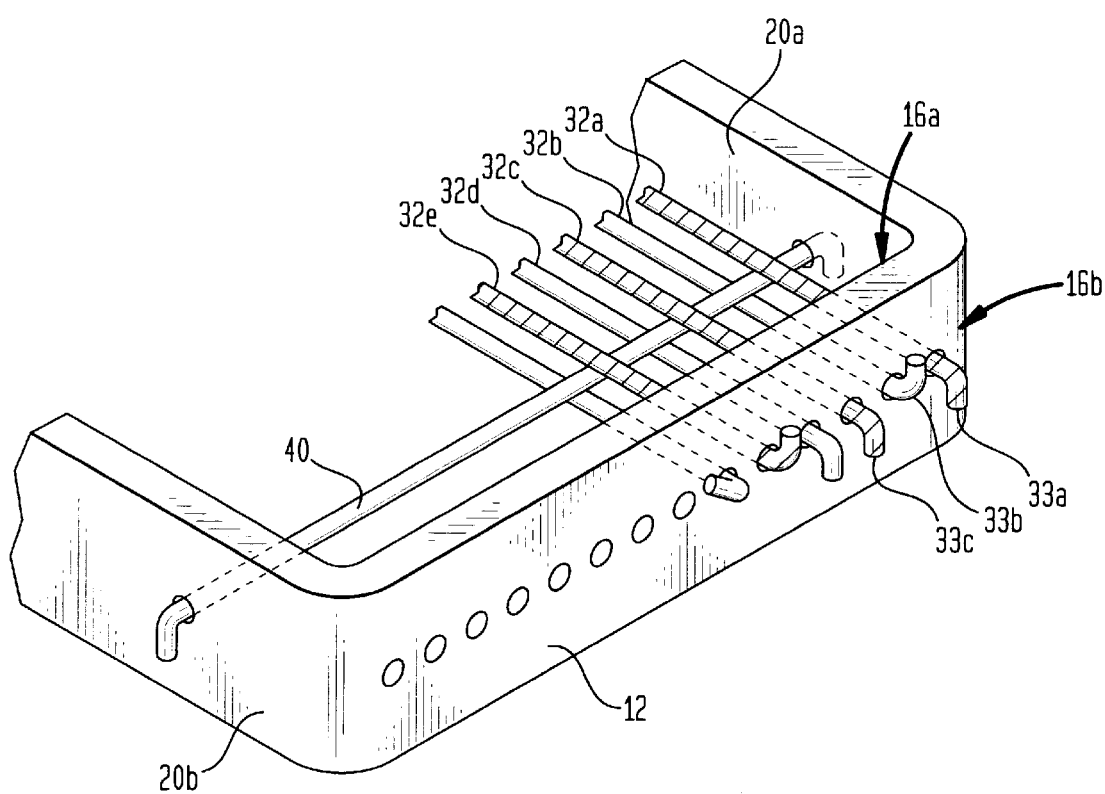
FIG. 2 shows a perspective, cut-away view of an inventive weaving device looking at a side of the device with pliant rods in the process of being weaved.

FIG. 2 shows a perspective view of an alternative embodiment of the weaving frame for use in the inventive method looking at a side of the frame (e.g., facing lateral bar 20b), with pliant rods in the process of being weaved on the device, further demonstrating use and benefits of the device. In FIG. 2, like character references are used to refer to like features as shown in FIGS. 1A–1B. The rods 32a, 32c, 32e, etc., are shown with hatching to designate different alternating colors, which is preferred for making colorful toys and figures. Once the pliant rods are weaved through the openings in the member 12, each of their free ends (e.g., 33a, 33b, 33c) may be bent against a side surface 16b of the member, as shown. When a device having facing sides is used, the distance between the sides advantageously is smaller than the length of the pliant rods so that the ends of the rods can be held on the device by bending free ends (33a, 33b, etc.), against the device as illustrated. Although the rods are pliant, they preferably should have little resilience (e.g., be sufficiently stiff) so that once they are thread through and then bent against the member, they will stay in place, i.e., remain fixed on the device. This way, the rods may be secured onto the device to enable the user to perform the weaving function and yet, each of the parts of the device 10 may have substantially smooth outer surfaces, free of any projecting teeth or pins as used in previous weaving devices.

Applicant has found that it may be advantageous to alter the dimensions based upon the intended users. For example, for devices intended for use by younger children, it may help to have larger pliant rod holes or pliant rod slots with larger spacings between them, and also, in that case it may help to have a greater thickness for the frame to maintain its sturdiness. Also, naturally, the size and spacings used for the pliant rod holes or pliant rod slots may have an impact upon the number of holes or slots that may fit along the length of the members or side bars. However, applicant has found that fifteen to thirty pliant rod holes or slots work well, and more preferably twenty to twenty-five pliant rod holes or slots may be used, and that devices for both younger and older children may be formed within the range of dimensions discussed above.

Where tufted wire rods are used (e.g., pipe cleaners which comprise tufted fabric or material secured to wires), the openings preferably should be sized to have a width smaller than the outer dimensions of the tufts but larger than the dimensions of the wire. In this way, the pliant rods 32a, 32b, 32c, can be slid into the openings and secured to a single member, as shown in FIG. 1. While the pliant rods are flexible, they also are sufficiently sturdy and have little resilience so that the rods defining a warp weave can be secured to the single member and held sufficiently in place to perform the weaving function. Corresponding, facing parallel members to retain both ends of the pliant rods in place therefore are not required, and the lateral bars 20a, 20b of FIG. 1A are not necessary.

FIGS. 3A–3E show steps for performing the inventive method of making a plurality of different toys and toy figures using the frame as previously described. Basically, the weaving device is first used to form the pliant rods into a weaved piece 50, as previously described and illustrated in FIG. 3A. Pliant rods 32a, 32b, 32c, etc., may be successively inserted into the openings of the elongated member 12, above and below the woof base 40, as shown in FIGS. 1B and 2, and secured onto the frame by bending the free ends (e.g., FIG. 2). As previously discussed, the warp weave pieces can be inserted before the woof weave is begun or vice versa. Other types of weaving steps may be performed, as are known.

Figure 3A:
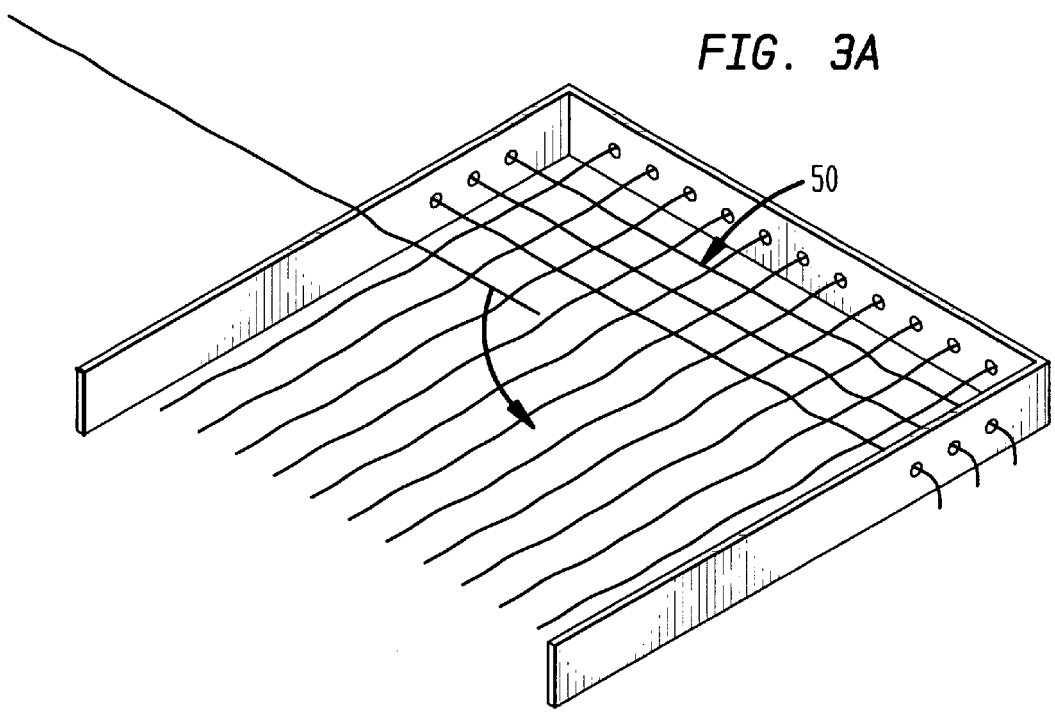
FIGS. 3A–3E show steps of the method of making a plurality of different toys and toy figures and exemplary toys made using these steps.
Figure 3B:
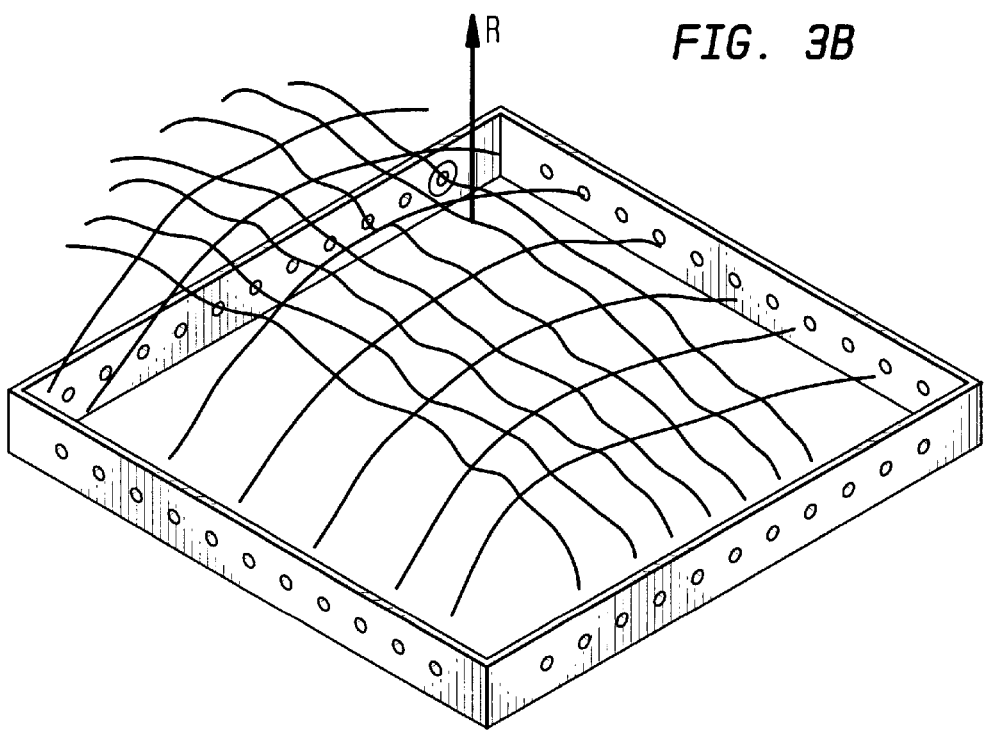
Figure 3C:
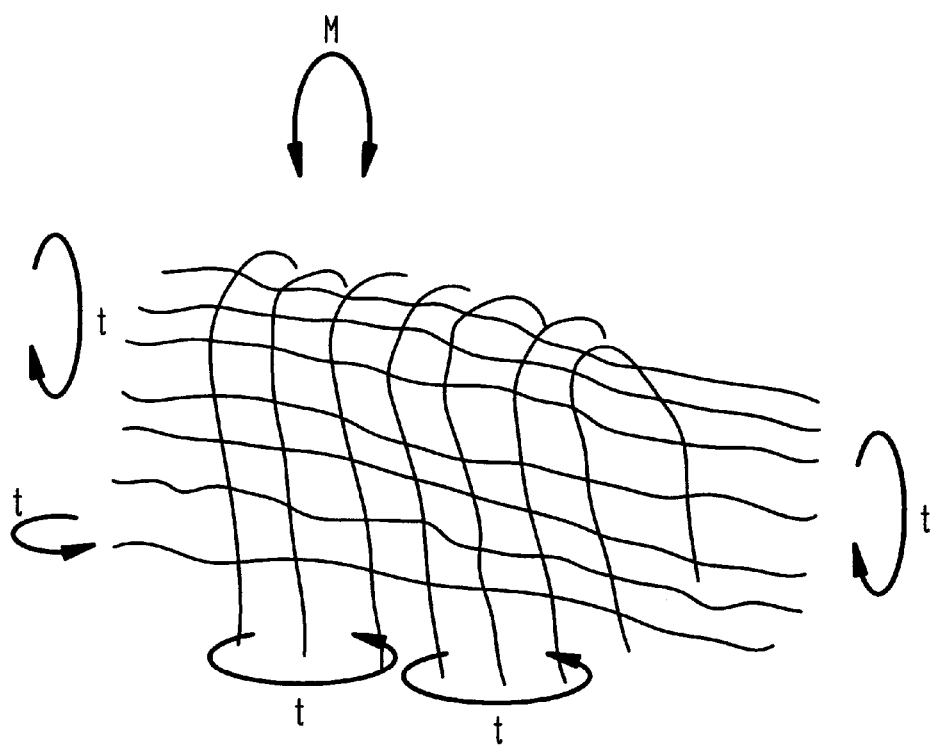
Figure 3D:
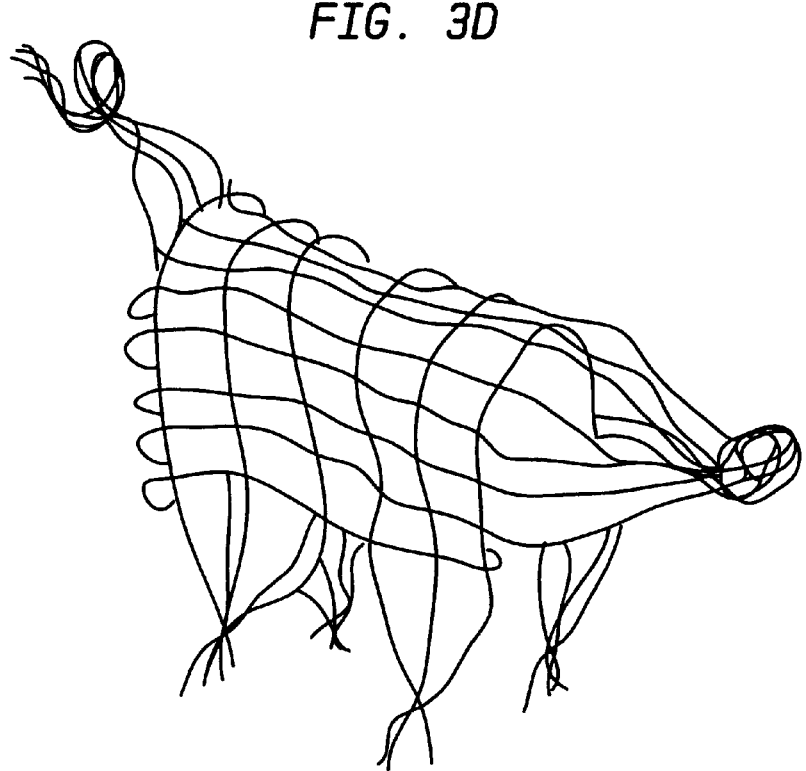
Figure 3E:
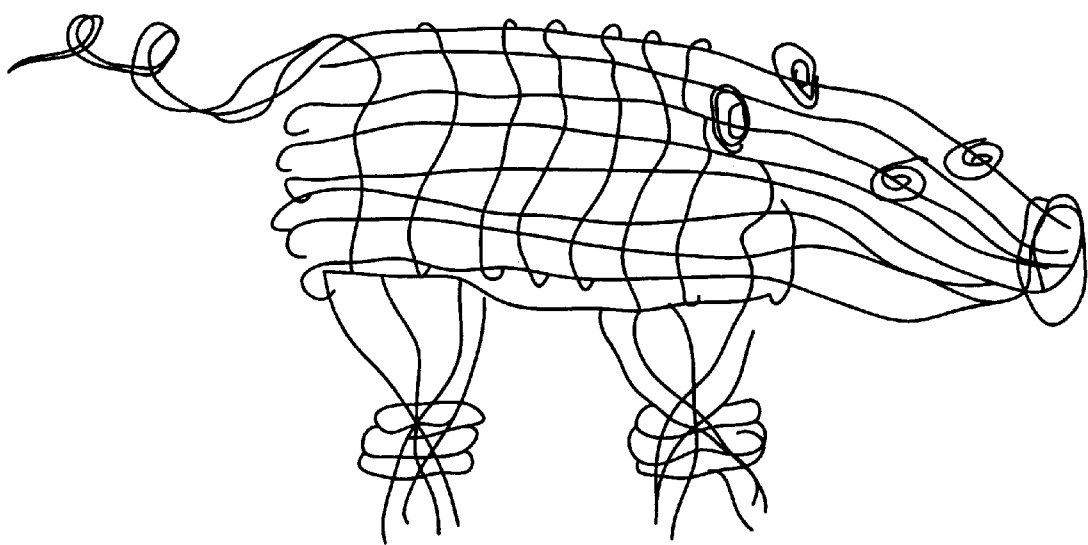
Figure 3F:
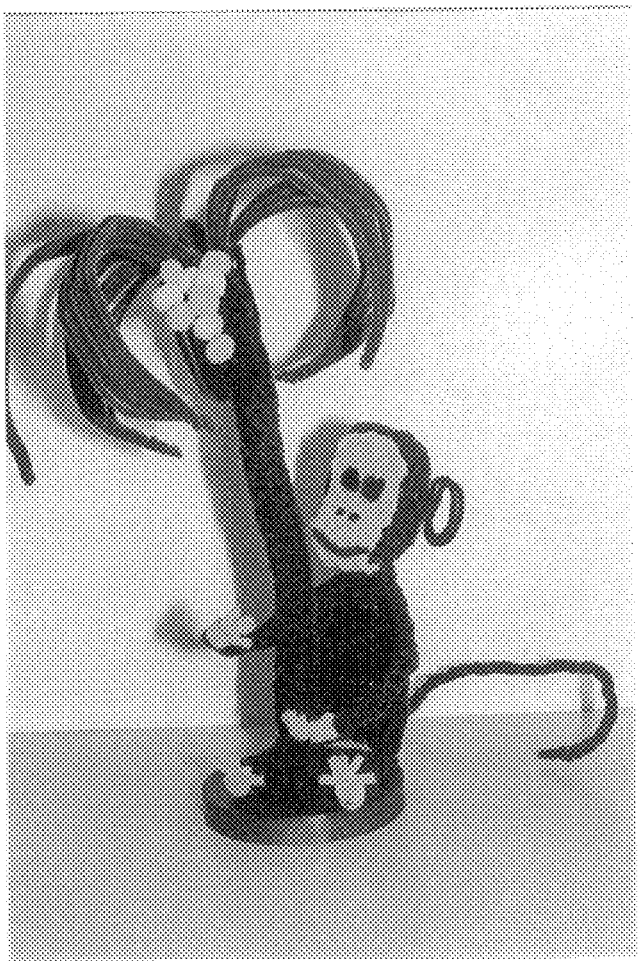
FIGS. 3F–3H show various toy figures that may be made with the inventive method.
Figure 3G:
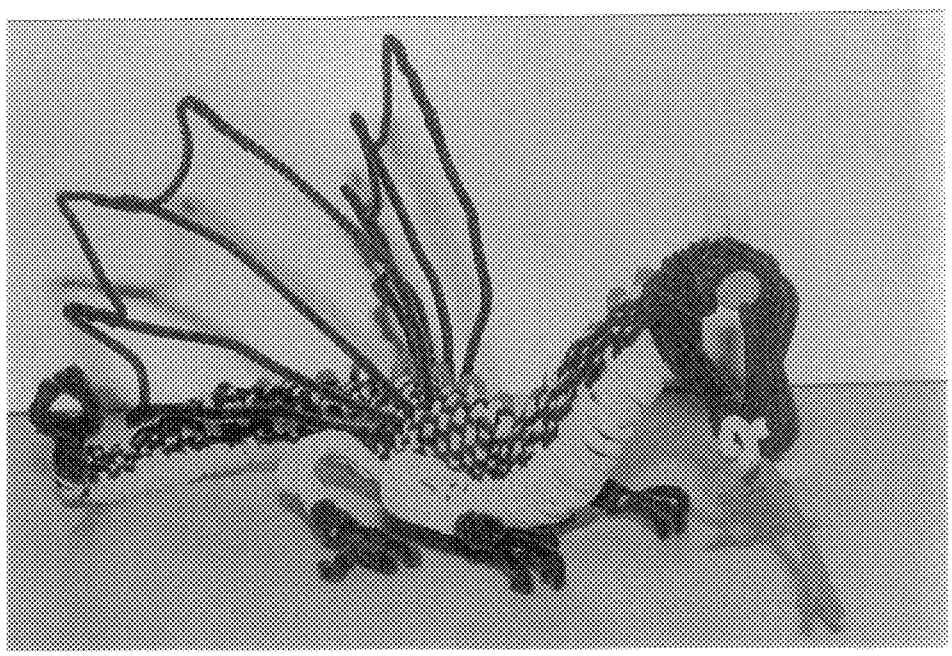
Figure 3H:
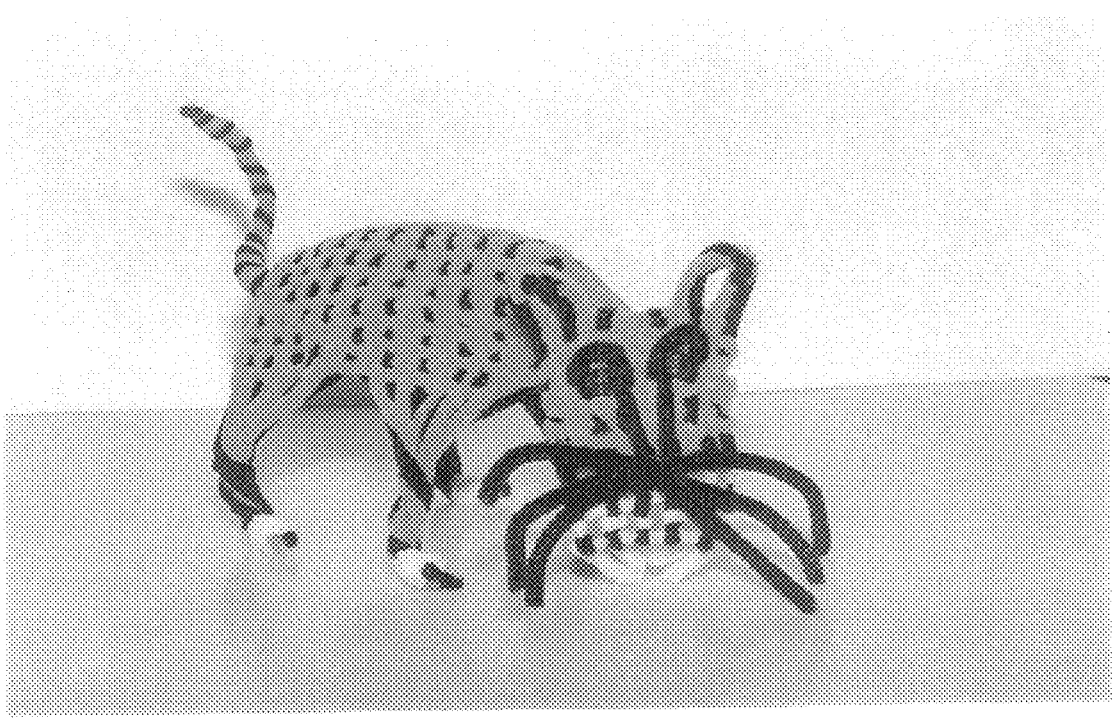

Once the weaved piece 50 is made, it can be removed from the frame, for example, by pushing or pulling the weaved piece from the frame following the arrow R in FIG. 5B. It may be necessary to first straighten out any free ends that have been bent against the surface of the members or bars (e.g., as shown in FIG. 2). Generally, once removed, the piece 50 will have free ends 33a, 33b, 33c, 33d, etc. The pliant rods forming the weaved piece may be bent to create the toy figure. For example, in FIG. 3C, the piece is first bent adjacent its midpoint (i.e., it is basically folded over in half) (arrow "M" of FIG. 3C). Following the arrows "T" in FIG. 3C, the free ends from the rods defining the warp weave may be twisted to form legs for a toy figure, and free ends from the rods defining the woof weave may be either bent under the piece or twisted to form a nose and a tail for a toy figure, i.e., a pig. The resultant toy figure is shown in FIG. 3D. Pliant rods or pipe cleaners of various lengths may be twisted around the legs, nose, or tail to add various features or designs to the toy figure, as shown in FIG. 3E. Naturally, other decorative items may also be added, such as, for example, beads, pom-poms, bows, yarn, or ribbon. FIGS. 3F–H show other figures that may be made from the weaved piece, drawing on the user's creativity. Also, more than one weaved piece may be joined together to form a larger figure.

It is understood that the embodiments described herein are merely exemplary and that a person skilled in the art may make variations and modifications without departing from the spirit and scope of the invention. For example, although the invention is described with reference to pipe cleaners that are now generally available, it may be used with other pliant rods of various sizes and shapes, with the frame adjusted or adjustable relative to the size of the pliant rods. All such variations and modifications are intended to be included within the scope of the appended claims.

I claim:

1. A method of making a toy figure with a weaved piece, the method comprising the steps of:

provising a plurality of pliant rods and a weaving device, wherein (i) the device comprises at least one elongated member having two opposing surfaces and a plurality of pliant rod openings traversing the at least one elongated member from one surface to the other surface (ii) each of the plurality of pliant rod openings is configured to hold at least one pliant rod in place by frictionally engaging the at least one pliant rod about its periphery, and (iii) each of the plurality of pliant rods is sufficiently flexible so as to be bendable and sufficiently stiff so as to remain substantially in place once bent on the weaving device, wherein when one pliant rod is thread through each of the plurality of pliant rod openings, a warp weave may be defined for creating the weaved piece;

threading one of the plurality of pliant rods through each one of the plurality of pliant rod openings traversing the at least one elongated member to define a warp weave;

weaving pliant rods through the warp weave at substantially right angles to the rods forming the warp weave to define a woof weave such that the warp weave and the woof weave form the weaved piece;

removing the weaved piece from the weaving device; and bending the pliant rods forming the weaved piece to create the toy figure.

2. The method of claim 1, in which the step of providing pliant rods further comprises providing pipe cleaners.

3. The method of claim 1 in which the step of threading and the step of weaving are performed sequentially.

4. The method of claim 1 in which the step of threading and the step of weaving are performed alternatively.

5. The method of claim 1 wherein the weaving device comprises a four-membered frame comprising two sets of substantially parallel elongated members.

\* \* \* \* \*